United States Patent [19]
Paddington

[11] 3,850,454
[45] Nov. 26, 1974

[54] PIPE COUPLINGS

[75] Inventor: Arthur Loftus Paddington, Shifnal, England

[73] Assignee: British Ropes Limited, Yorkshire, England

[22] Filed: Feb. 26, 1973

[21] Appl. No.: 335,668

[30] Foreign Application Priority Data
Mar. 15, 1972 Great Britain.................. 12030/72
Sept. 15, 1972 Great Britain.................. 42832/72

[52] U.S. Cl.................... 285/98, 285/281, 285/379, 285/DIG. 5
[51] Int. Cl............................................ F16l 17/00
[58] Field of Search............ 285/98, 420, 275, 278, 285/280, 281, 379, DIG. 5, 364, 352; 308/36.3

[56] References Cited
UNITED STATES PATENTS
2,907,590   10/1959   Oswald........................... 285/281 X
3,392,993   7/1968    Myers............................. 285/281 X
3,473,830   10/1969   Haley............................. 285/420 X FOREIGN PATENTS OR APPLICATIONS
320,231   2/1970    Sweden............................... 285/52
942,777   11/1963   Great Britain....................... 285/280

Primary Examiner—Dave W. Arola
Attorney, Agent, or Firm—Morgan, Finnegan, Durham & Pine

[57] ABSTRACT

Pipe coupling including a swivel joint utilizing self-lubricating material. The coupling may be used on a loading arm for tank vessels and an adaptor plate may form part of the swivel joint. A pipe coupling is also provided for use on a loading arm which comprises a swivel assembly formed integrally as part of a connector arrangement.

12 Claims, 3 Drawing Figures

PIPE COUPLINGS

The invention relates to pipe couplings and more particularly to swivel joints therefor.

According to one aspect of the invention there is provided a pipe coupling in the form of a swivel joint comprising an annular pipe attachment member which is rotatably mounted relative to a further pipe attachment member with a substantially fluid tight bearing formed of self-lubricating material located therebetween.

The bearing may comprise a U-section annular member of self-lubricating material which is carried on a flange on the pipe attachment member and housed in an annular, radially inwardly directed channel in the further pipe attachment member. The face of the annular member facing the further pipe attachment member may be convex and abut a lip seal, which may be of self-lubricating material, which forms one wall of said channel. The radial outer edge of said convex face may also be abutted by a surface formed of stainless steel which also forms a part of said one wall of said channel.

The flange on the pipe attachment member may be formed on an annular plate which is attached to and forms part of the pipe attachment member. Said annular plate may be fabricated of stainless steel.

According to a further aspect of the invention there is provided a pipe coupling which comprises a tubular member formed with a flange at one end, an annular member having respective internal faces which lie adjacent the faces and outer circumferential edge of the flange, the annular member carrying at least two retractable clamping arms thereon adapted to releasably clamp a pipe flange, of a pipe to be coupled to the tubular member, to said annular member, and self-lubricating material interposed between, on the one hand, the faces and outer edge of the flange on the tubular member, and, on the other hand, the said internal surfaces of the annular member, whereby the annular member and clamping arms are capable of rotational movement about the flange on the tubular member.

Preferably the self-lubricating material is carried on the faces and edge of the flange on the tubular member.

A portion of the annular member remote from the tubular member may be separately removable to form an adaptor plate.

According to yet a further aspect of the invention there is provided a pipe coupling which comprises a tubular member formed with a flange at one end, which flange carries or is formed with self-lubricating material over both its faces and circumferential outer edge, an annular member having internal faces which abut the inner face of said flange which is adjacent the tubular member and the circumferential outer edge of the flange, the annular member carrying at least two retractable clamping arms thereon adapted to releasably clamp a pipe flange, of a pipe to be coupled to the tubular member, to an adaptor plate which is releasably coupled to said annular member so as to have a face thereof which abuts the other outer face of the flange, the whole arrangement being such that the annular member, adaptor plate and clamping arms are capable of rotational movement about the flange on the tubular member.

Said flange may comprise a separate ring attached, for example, by bolting, to the tubular member.

Said self-lubricating material may comprise polytetrafluoroethylene, which may include a suitable filler, such as carbon, to give added compressive strength.

According to a still further aspect of the invention there is provided a pipe coupling comprising a swivel assembly and connector means adapted to be suspended from a loading arm, wherein said swivel assembly is integrally formed with the connector means.

The foregoing and further features of the invention may be more readily understood from the following description of a preferred embodiment thereof, by way of example, with reference to the accompanying drawings, in which.

Figure 1:
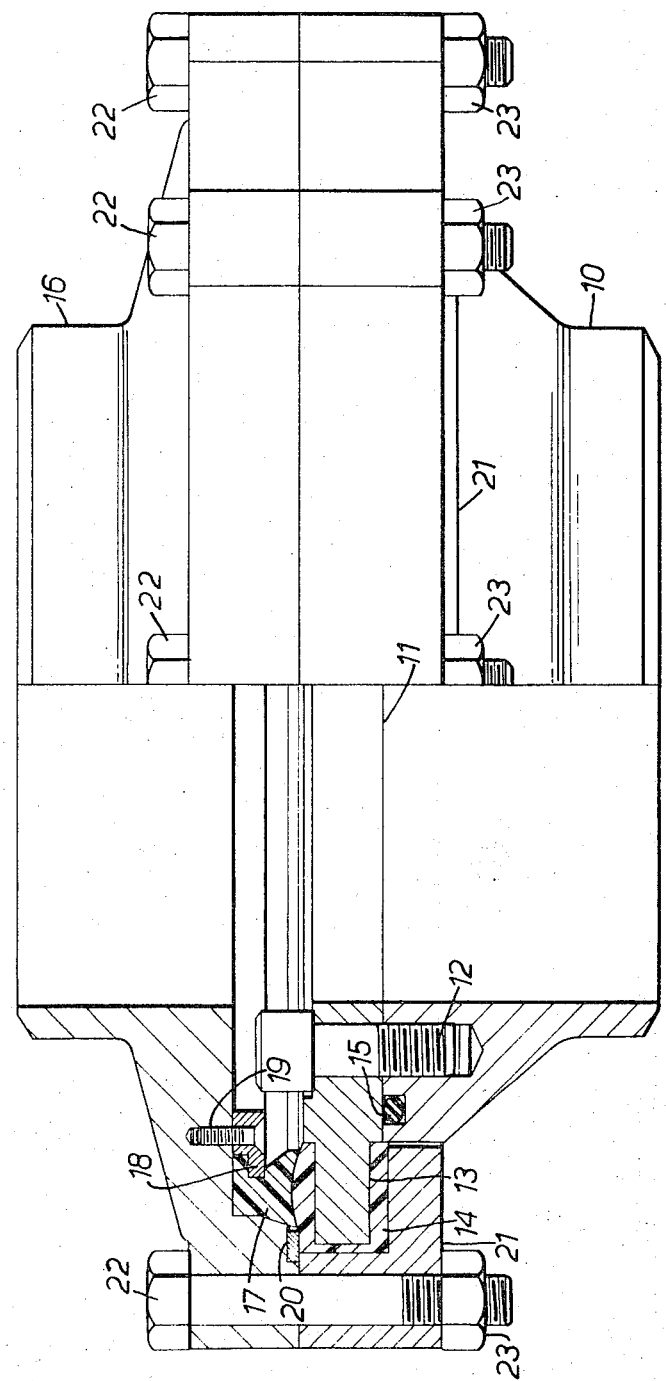
FIG. 1 is a side elevational view, half in section, of a swivel joint pipe coupling.

Referring now firstly to FIG. 1 there is shown a swivel joint for rotatably mounting one pipe relative to another. The joint comprises a pipe attachment member 10 to which a pipe is welded in use of the joint. Alternatively the member could be formed with a flange for bolting to a flange on the pipe. An annular plate 11 is bolted by bolts 12 (one only shown) to the member 10 and extends radially outwardly to form a flange 13. An annular member 14 of self-lubricating material such as carbon filled polytetrafluoroethylene, which has a U-shaped cross-section is located around flange 13. A ring seal 15 is located between the member 10 and plate 11.

A further pipe attachment member 16 is formed to be generally cup-shaped to accommodate bolts 12 and the other pipe (not shown) is attached to this member 16. An annular lip seal 17 is attached around the inner surface of member 16 with an annular retaining ring 18 by screws 19 (one only shown). The axially directed sealing surface of seal 17 abuts a convex face formed on member 14 to provide a pressure seal therewith. The seal 17 may be formed of rubber with the sealing surface coated with polytetrafluoroethylene or for use with cryogenic liquid the whole seal 17 may be formed of polytetrafluoroethylene. An axially directed portion of the face of member 16 adjacent seal 17, which abuts member 14 is formed with a deposit 20 of stainless steel. An L-section annular member 21, formed of stainless steel, is bolted to member 16 by bolts 22 and cooperating nuts 23. The inner surfaces of member 21 with the sealing surface of lip seal 17 form a channel which encompasses member 14 and in which member 14, and hence plate 11 and member 10, is freely rotatable relative to member 16. The radially extending portions of member 14 provide a bearing for tension and the axially extending portion of member 14 provides a bearing for shear. It will be realised that pipes attached to members 10 and 16 will be freely rotatable one relative to the other.

Since the bearing surfaces of the joint require no lubricant, no servicing of the joint is necessary for long periods. Since a lip seal 17 is used for the pressure seal wear of such seal causes no leakage problems.

Figure 2:
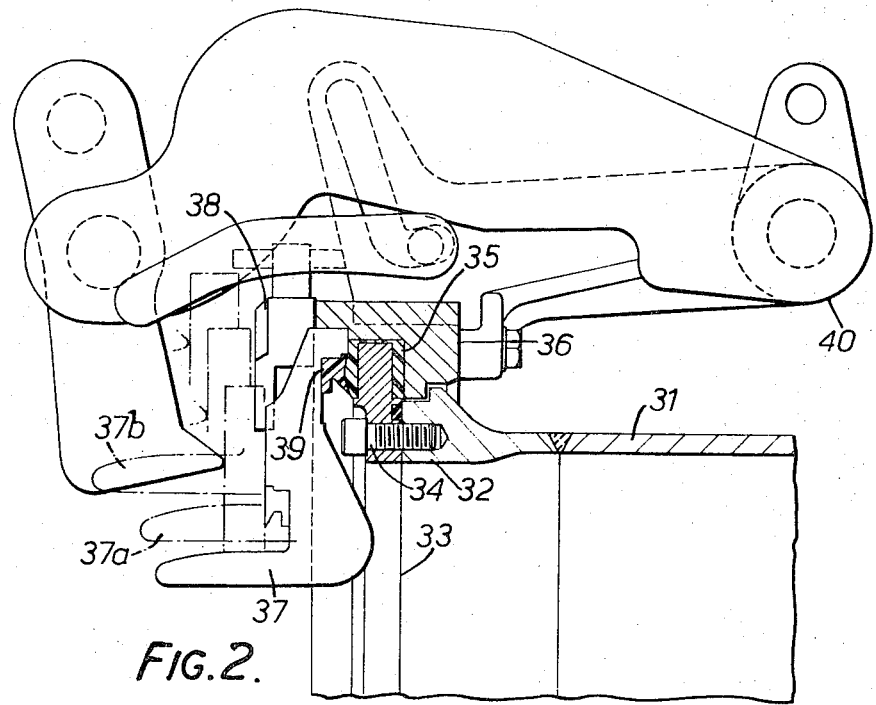
FIG. 2 is a side sectional view of a part of a pipe coupling.
Figure 3:
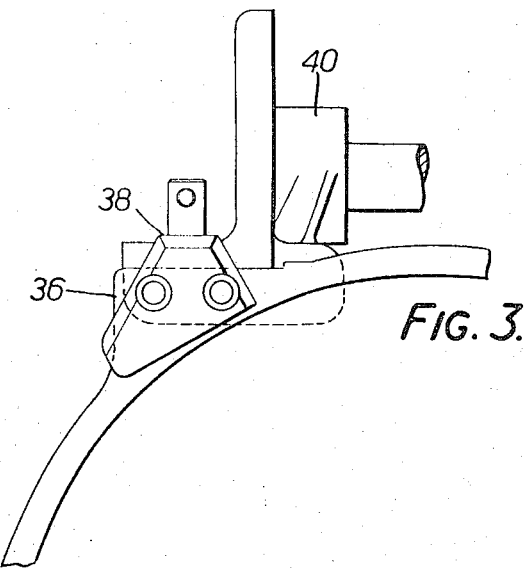
FIG. 3 is an end elevational view of a part of FIG. 2.

Referring now to FIGS. 2 and 3 of the drawings there is shown a further similar pipe coupling suitable for use on a marine loading arm, for loading and unloading tank vessels.

The coupling comprises a pipe 31, which forms part of the loading arm (not shown), to which is welded a tubular member 32. A ring 33 is bolted to member 32 by bolts 34 and carries polytetrafluoroethylene 35 over its projecting faces and circumferential outer edge.

An annular member 36 is located about the tubular member 32 and has internal faces which abut the polytetrafluoroethylene 35, on the axially inner face and outer edge of ring 33. An adaptor plate 37 is attached by releasable clamping arrangements 38 about the annular member 36. The adaptor plate 37 may be replaced by different size adaptor plates 37a or 37b depending upon the size of pipe to be coupled. The adaptor plate 37 is preferably as disclosed in our copending application Ser. No. 48,211 filed June 22, 1970 and now U.S. Pat. No. 3,715,135. The adaptor plate 37 includes a polytetrafluoroethylene lip seal 39 which abuts the axially outer face of ring 33 which is of convex form as in the FIG. 1 arrangement.

The annular member 36 carries two or more, usually three, clamping assemblies, indicated generally at 40, circumferentially spaced equidistantly around it. The clamping assemblies 40 are preferably as disclosed in our copending application, Ser. No. 333,737 filed Feb. 20, 1973.

In use, with the correct size adaptor plate 37 located in position, the flange of a pipe (not shown) to be coupled is clamped by the clamping assemblies 40 to the outer face of adaptor plate 37.

When so coupled the pipe, adaptor plate 37, annular member 36 and clamping assemblies 40 are capable of rotational movement about the ring 33, with the non-lubricant material 35 providing the bearing surfaces. Such movement allows for fore and aft ships motion and change of altitude in relation to the shore installation on which the loading arm is provided, without the need for a separate swivel bearing on the loading arm.

I claim:

1. A pipe coupling in the form of a swivel joint, comprising:
   a first annular pipe attachment member having a flange thereon;
   a second annular pipe attachment member formed with an annular radially inwardly directed channel;

an annular member of self-lubricating material having a U-shaped cross-section, said U-shaped annular member being located about and in contact with said flange and abutting said channel of said second annular pipe attachment member, said U-shaped annular member including a convex surface portion; and
   lip sealing means carried on said second annular pipe attachment member, said lip sealing means including a sealing surface abutting said convex surface portion of said annular member under pressure so as to operate as a pressure seal for liquid passing through said first and second pipe attachment members;
   whereby said first annular pipe attachment member is freely rotatable with respect to said second annular pipe attachment member.

2. A pipe coupling in accordance with claim 1, wherein said lip sealing means is made of a self-lubricating material.

3. A pipe coupling in accordance with claim 2, wherein the radial outer edge of said convex surface portion abuts a stainless steel surface forming a part of one wall of said channel of said second annular pipe attachment member and said flange is made of stainless steel.

4. A pipe coupling in accordance with claim 3 wherein said U-shaped annular member and said lip sealing means are both made of polytetrafluoroethylene.

5. A pipe coupling comprising:
   a tubular member having a flange at one end, said flange having an inner face, an outer face and an outer circumferential edge;
   an annular member having internal faces spaced from the inner face and outer circumferential edge of said flange;
   an adaptor plate adapted to be releasably coupled to said annular member and releasably clamped to a flange of a pipe to be coupled to said tubular member said adaptor plate having a face abutting the outer face of said flange of said pipe to be coupled to said tubular member;
   an annular ring of self-lubricating material having a U-shaped cross-section located about and in contact with both said inner and outer faces and said outer circumferential edge of said flange and abutting the internal faces of said annular member, said annular ring of self-lubricating material having a convex surface portion facing said adaptor plate;

lip sealing means carried on said adaptor plate, said lip sealing means including a sealing surface abutting the convex surface portion of said U-shaped annular ring under pressure so as to operate as a pressure seal for liquid passing through the pipe coupling;
   said annular member carrying at least two retractable clamping arms thereon for releasably clamping the flange of said pipe to be coupled to said tubular member so that the annular ring of self-lubricating material provides a bearing surface to allow rotational movement of the annular member and clamping arms about the flange of said tubular member and the tubular member.

6. A pipe coupling in accordance with claim 5, wherein said flange comprises a separate ring attached to the tubular member.

7. A pipe coupling in accordance with claim 6, wherein said lip sealing means is also made of self-lubricating material.

8. A pipe coupling in accordance with claim 7, wherein said annular ring of self-lubricating material and said lip sealing means are both made of polytetrafluoroethylene.

9. A pipe coupling comprising:
   a tubular member having a flange at one end, said flange having an inner face, an outer face and an outer circumferential edge;
   an annular member having internal faces spaced from said inner and outer faces and outer circumferential edge of the flange;
   an annular ring of self-lubricating material having a U-shaped cross-section and interposed between and in contact with said inner and outer faces and outer circumferential edge of the flange and said internal faces of the annular member, said annular ring having a convex surface portion facing one internal face of said annular member, and lip sealing means carried on the internal face of said annular member, said lip sealing means including a sealing surface abutting said convex surface portion of said U-shaped annular ring under pressure so as to operate as a pressure seal for liquid passing through the pipe coupling, said annular member carrying at least three retractable clamping arms to releasably clamp a flange of a pipe to be coupled to said tubular member so that the annular ring of self-lubricating material provides a bearing surface to allow rotational movement of the annular member and clamping arms about the flange of the tubular member and the tubular member.

10. A pipe coupling in accordance with claim 9, wherein said flange of the tubular member comprises a separate ring attached to the tubular member.

11. A pipe coupling in accordance with claim 10, wherein said lip sealing means is also made of self-lubricating material.

12. A pipe coupling in accordance with claim 11 in which said annular ring of self-lubricating material and said lip sealing means are both made of polytetrafluoroethylene.

* * * * *